(12) United States Patent
Dose et al.

(10) Patent No.: US 8,720,493 B2
(45) Date of Patent: May 13, 2014

(54) FILLING A FOOD PRODUCT INTO CONTAINER ON A SLAT CONVEYOR

(75) Inventors: Steffen Dose, Beauvais (FR); Jean-Michel Christophe Marchon, Beauvais (FR)

(73) Assignee: Nestec S.A., Vevey (CH)

( * ) Notice: Subject to any disclaimer, the term of this patent is extended or adjusted under 35 U.S.C. 154(b) by 1029 days.

(21) Appl. No.: 12/597,868

(22) PCT Filed: Apr. 18, 2008

(86) PCT No.: PCT/EP2008/905474
§ 371 (c)(1),
(2), (4) Date: Oct. 27, 2009

(87) PCT Pub. No.: WO2008/132074
PCT Pub. Date: Nov. 6, 2008

(65) Prior Publication Data
US 2010/0132310 A1    Jun. 3, 2010

(30) Foreign Application Priority Data

Apr. 27, 2007  (EP) .................................... 07107156

(51) Int. Cl.
*B65B 1/04*  (2006.01)
*B65B 3/04*  (2006.01)
*B65B 43/42*  (2006.01)
*B65B 3/00*  (2006.01)

(52) U.S. Cl.
USPC ............... 141/2; 141/129; 141/163; 141/168; 141/172; 198/468.6; 198/750.14; 198/793

(58) Field of Classification Search
USPC ........... 141/2, 129, 163, 168, 172; 198/468.6, 198/750.14
See application file for complete search history.

(56) References Cited

U.S. PATENT DOCUMENTS

| | | | | |
|---|---|---|---|---|
| 2,975,732 A | * | 3/1961 | De Pasquale | ................. 426/249 |
| 3,145,829 A | * | 8/1964 | Janouschek et al. | .......... 198/706 |
| 3,286,811 A | * | 11/1966 | McWilliams | ............ 198/370.04 |
| 3,770,150 A | * | 11/1973 | Clark | ............................ 414/564 |
| 4,421,227 A | * | 12/1983 | Kornylak | ...................... 198/800 |
| 4,736,687 A | * | 4/1988 | Grube et al. | ............... 104/88.04 |
| 4,751,806 A | | 6/1988 | Gram | |
| 4,788,786 A | * | 12/1988 | Suter | .......................... 134/56 R |
| 5,054,600 A | * | 10/1991 | Blankemeyer et al. | ..... 198/345.2 |
| 5,135,767 A | * | 8/1992 | Daouse | ......................... 426/515 |

(Continued)

FOREIGN PATENT DOCUMENTS

EP   0078342    5/1983
GB   736500     9/1955

OTHER PUBLICATIONS

International Search Report dated Jul. 23, 2008.

*Primary Examiner* — Timothy L Maust
*Assistant Examiner* — Brandon J Warner
(74) *Attorney, Agent, or Firm* — K&L Gates LLP

(57) ABSTRACT

The invention relates to the filling of a frozen dessert product in a container, by performing the steps of: arranging at least one container to be filled on a slat conveyor, moving the container on the slat conveyor towards a dispensing nozzle, vertically displacing at least one slat supporting the container, and horizontally displacing the slat supporting the container in a direction perpendicular to the transport direction of the slat conveyor, while dispensing the product from the dispensing nozzle into the container.

13 Claims, 3 Drawing Sheets

(56) References Cited

U.S. PATENT DOCUMENTS

| | | | |
|---|---|---|---|
| 5,283,070 A * | 2/1994 | Bertrand et al. | 426/249 |
| 5,860,507 A * | 1/1999 | Foster | 198/750.3 |
| 6,666,320 B1 * | 12/2003 | Fessler | 198/346.3 |
| 7,090,071 B2 * | 8/2006 | Enomoto | 198/841 |
| 7,185,755 B1 * | 3/2007 | Foster et al. | 198/750.2 |

* cited by examiner

FILLING A FOOD PRODUCT INTO CONTAINER ON A SLAT CONVEYOR

The invention generally relates to the filling of a food product, such as e.g. a frozen confectionery (ice cream, water ice, sorbet, frozen yoghurt, sherbet etc.) into an open container, which typically occurs at the manufacturing site of such food product.

The invention thereby uses a slat conveyor for transporting the container to be filled to a product filling location.

Slat conveyors for handling food products are well known from the prior art.

U.S. Pat. No. 6,666,320 proposes a slat conveyor for handling ice cream products which are immersed for some time in processing vessels. Each slat in the conveyor consists of an upper part supported at a fixed height in the frame of the machine and a lower part that may be lifted and lowered by means of a lifting beam. The lower part of the slat is supported by individually coupling and uncoupling means. The means are connected with the lifting beam and the means are connected with the frame. By activating and deactivating the means together with the lifting beam it is possible to keep the products in a raised position or in a lowered position throughout one or more successive operations. Hereby the process period may easily be varied and the slat conveyor can readily be adapted to different products just by changing the programming of the control unit for the coupling means and the lifting beam.

U.S. Pat. No. 4,751,806 teaches a production apparatus which comprises a step-wise driven conveyor adapted to receive articles to be subjected to different operations. Along the conveyor, operative devices are arranged for carrying out the different operations to which the articles are to be subjected. The operative devices having comparatively short operation periods are stationarily arranged along the conveyor, whereas at least two operative devices having comparatively long operation periods, are movably arranged along the conveyor so as to follow the conveyor while the conveyor makes at least one step and then to be moved one such step opposite to the direction of movement of the conveyor. By such doubling of the operative device or devices having long operation periods, an increased capacity of the production apparatus is achieved. The production apparatus can be used in producing ice cream cornets.

It is the object of the present invention to propose an improved technique for filling a food product into containers arranged on and transported by a slat conveyor.

This object is achieved by means of the features of the independent claims. The dependent claims develop further the central idea of the present invention.

Generally, according to the invention the slats accommodating a container are separated from the main chains of the slat conveyor such that they are free to be manipulated in any degree of freedom (translation and/or rotation).

A first aspect of the invention relates to a method for filling a product in a container, comprising the steps of:
- arranging at least one container to be filled on a slat of a step-wise driven slat conveyor,
- moving the container on the slat conveyor towards a dispensing nozzle,
- vertically displacing at least one slat supporting the container, and
- manipulating the slat supporting the container in at least one degree of freedom while dispensing the product from the dispensing nozzle into the container.

The degree of freedom can be any sequence of rotation and/or translation relative to the filling nozzle.

Thereby the vertical displacement can be a lifting movement and the degree of freedom can be a horizontal displacement.

The product can be a frozen confectionery or dessert such as e.g. ice cream, water ice, frozen yoghurt, sorbet, sherbet but also a mousse-type product.

The at least one slat supporting the container can be moved by gripper means in the vertical and/or horizontal direction.

The gripper means can engage the at least one slat from the inside and/or the outside of the chains of the slat conveyor.

If necessary, the at least one slat can be separated from the chains of the slat conveyor before being engaged by the gripper means.

The dispensing nozzle can be stationary at least during the filling action.

The dispensing nozzle can be displaced during the filling action.

The slats can be separated off the main chains of the slat conveyor during the filling action.

The at least one slat supporting the container can be additionally moved vertically while filling the product in the container.

A further aspect of the invention relates to a container filled with product by using a method as defined above.

The product is for example a frozen confectionery prepared by a conventional process or by another process such as a Low Temperature Freezing (LTF) process.

The corners of the container can be filled essentially without voids.

A further aspect of the invention relates to a slat conveyor for container to be filled with a product while being supported by at least one slat of the slat conveyor. The slat conveyor comprises:
  means for step-wise driving the slat conveyor,
    optional means for vertically displacing at least one slat supporting the container in order to free the at least one slat from the chains of the slat conveyor, and
    means for horizontally displacing the at least one slat supporting the container in a direction perpendicular to the transport direction of the slat conveyor.

The vertical displacement means can be designed for lifting at least one slat.

The slat conveyor can comprise means for gripping the at least one slat.

The slat conveyor can comprise means for separating the at least one slat from the main chains of the slat conveyor before the at least one slat is engaged by the gripper means.

A still further aspect of the invention relates to a system for filling container with a food product, comprising a slat conveyor as defined above and a dispensing nozzle designed for filling the food product into the container supported and transported by the slat conveyor.

The dispensing nozzle can be arranged to be stationary at least during the filling action.

The dispensing nozzle can be designed to be moved during the filling action.

The system can be designed to additionally move the at least one slat supporting the container vertically while the dispensing nozzle is operated for filling the product in the container.

Further advantages, objects and features of the present invention will become evident from the following detailed description of an embodiment of the present invention when taken in conjunction with the figures of the enclosed drawings.

Generally the invention proposes a system for filling containers on a conveyor whereby the conveyor slats are transferred vertically to an upper position by a gripping mechanism, and whereby the container is filled while moving the slat in a direction perpendicular to that of the conveyor.

"Filled" is to be understood as encompassing any transfer of a product to the container (filling, topping, decorating, . . . . )

The container remains supported on at least one slat of the slat conveyor while during the vertical and horizontal displacements.

Figure 1:
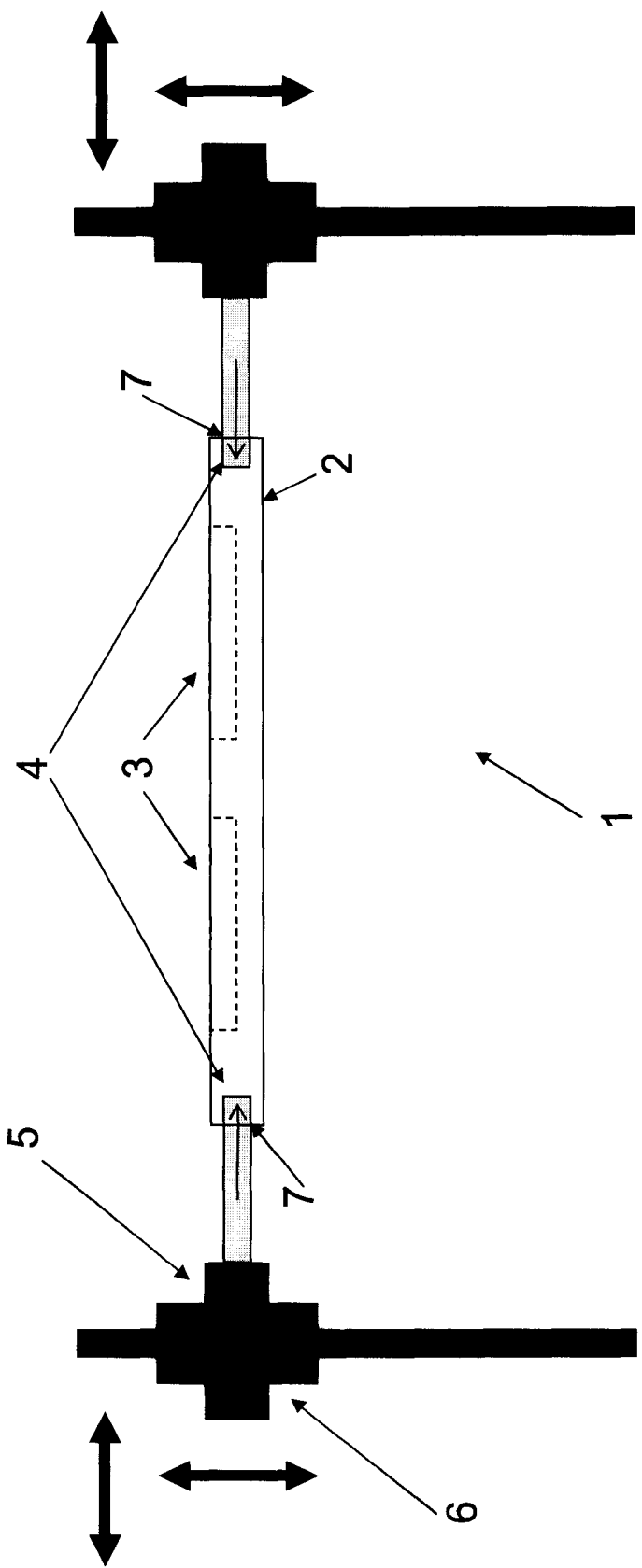
FIG. 1 shows a first view of the means of a slat conveyor for horizontally and vertically displacing slats.

FIG. 1 shows schematically a detail of a slat conveyor 1 according to the present invention. Note that FIG. 1 does only show the means for vertically and horizontally displacing a slat 2 of the slat conveyor 1. Regarding the well-known details of a slat conveyor, i.e. the chains for transporting the slat 2, the stepwise drive etc. reference is made to the prior art, such as for example the documents mentioned in the opening section.

As can be seen in FIG. 1, a slat 2 can be provided with a depression or opening 3 which is designed to accommodate or support containers to be filled.

In this context it can be advantageous if the containers have a conical shape in order to be securely positioned in the depression or aperture 3.

Both sides of the slat 2 are provided with recessions 7 which are designed to be engaged by selectively protruding engaging means 4 of a slat displacement mechanism.

The protruding engaging means 4 of the slat displacement mechanism can be controlled to move from a retracted position to the protruding position as shown in FIG. 1, in which they engage the recessions 7 of the slat 2.

Thus, in the state as shown in FIG. 1, the slat displacement mechanism engages a slat 2 such that the slat 2 can then be taken off the main transportation chains of the slat conveyor 1.

Note that the slat conveyor 1 according to the invention is advantageously driven stepwise. The slat displacement and container filling operation, which will be described in detail later on, takes place while the main chains of the slat conveyor 1 are not moving, i.e. between two steps of the stepwise drive.

FIG. 1 also shows schematically means for manipulating the slat in a rotational and/or translational degree-of-freedom, such as e.g. means 5 for horizontally displacing the slat 2 once it is taken of the main chain of the slat conveyor 1, as well as means 6 for vertically displacing, especially lifting the slat 2 of the main chains of the slat conveyor 1.

The vertical and horizontal displacement means 5, 6 can be operated e.g. pneumatically or using servo motors.

The slat displacement mechanism as shown in FIG. 1 is arranged close to a container filling side at which a dispensing nozzle fills a product, particularly a food product such as e.g. frozen confectionary into the container which is open at the top.

Figure 2:
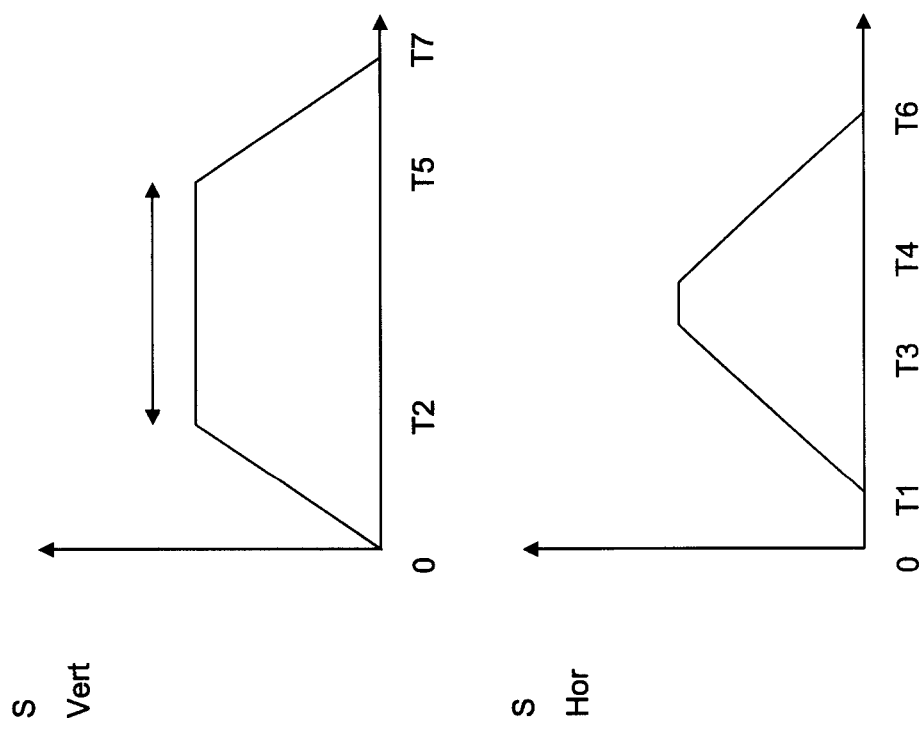
FIG. 2 shows a time chart of a horizontal and vertical movement of a slat of the conveyor while the chains of the step-wise driven conveyor stand still.

FIG. 2 shows a timing chart of the vertical displacement $S_{VERT}$ and horizontal displacement $S_{HOR}$ respectively, as carried out by the slat displacement mechanism shown in FIG. 1.

At the time $t=0$ the vertical displacement means 6 start lifting the slat 2.

At a time $t_1$ the horizontal displacement means 5 start horizontally displacing the slat 2. This horizontal displacement thus preferably starts while the lifting movement continues.

At a time $t_2$ the lifting movement is finished, e.g. the slat 2 has reached its maximum height and thus that vertical position close to a dispensing nozzle.

The horizontal displacement preferably continues after the end of the vertical lifting movement until the time $t_3$ is reached.

Between the time $t_2$ and $t_5$ there is no vertical movement.

Between the times $t_3$ and $t_4$, which is within the period defined by the times $t_2$ and $t_5$ and which is a relatively short period, no horizontal movement occurs. Therefore, in the period between $t_4$ and $t_3$ the slat is in the maximum displacement position and does not carry out any movement.

At a time $t_4$ while there is still no vertical movement, the slat 2 starts its horizontal reverse movement which is finished at a time $t_6$.

During this horizontal reverse movement, the vertical reverse movement starts at a time $t_5$ and is finished at a time $t_7$, which is after the end of the horizontal reverse movement at the time $t_6$.

The slat displacement action can be summarized as following:

Each slat is pre-released from the main chain by two guides of the slat conveyor, The protruding engaging means grip each side of the slat in order to vertically displace the slat in order to present it to a filling nozzle at an adequate height, The slat can also be moved horizontally while the containers are filled, which leads to a well controlled filling repartition even in horizontally long containers, and Different filling nozzles can add additional decoration potential.

The slat conveyor 1 according to the present invention is thus designed to allow a reliable automatic gripping of the slats which can then be freely moved in the vertical and horizontal direction while dosing product into containers accommodated in a slat.

Figure 3:
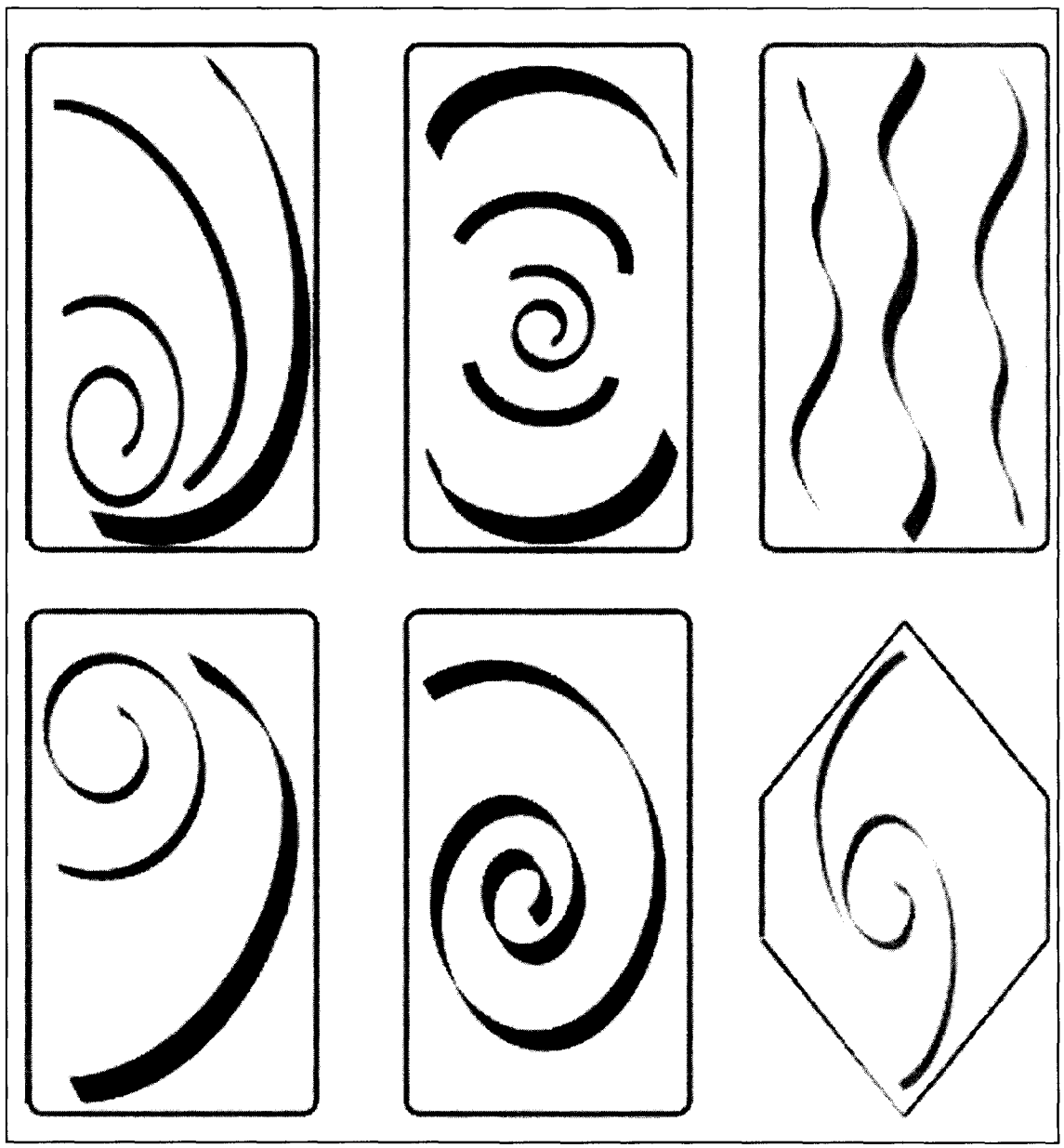
FIG. 3 shows different filling patterns obtained by means of the invention.

This system according to the invention thus allows a well controlled repartition of the product in the container during filling. It furthermore opens new possibilities for decoration of filling patterns. FIG. 3 shows different filling patterns which may be formed by different flavoured ice cream or combination of ripple sauces and ice cream.

In order to allow for the vertical lifting movement, the slats 2 according to the present invention are only placed on the chains of the slat conveyor, but not fixed.

The freely moveable slats therefore allow a well controlled filling of the containers without having to move the dosing device (filling nozzle). This has obviously advantages as the sides and the weight of the dosing unit otherwise limit the line speed if it has to be moved. Further on, the system of the invention dispenses with the necessity of having flexible hoses at inlet pipes, which facilitates the design of dosing units.

The above-defined technology can be used with a frozen confectionery prepared by a conventional process wherein the ingredients are first mixed in an appropriate mixer and subsequently pasteurized and homogenized or vice versa. The homogenized/pasteurized mixture is then optionally aged. The mix is then aerated until an appropriate overrun and frozen to a temperature of around −1 to −20° C. The frozen product can then be filled in a container according to the method of the invention. Finally, the ice confection produced may then be hardened to a temperature between −20° to −40° C. for several hours.

The above-defined technology is also advantageously adapted for so-called LTF (Low Temperature Freezing) products. Such a process typically comprises the following steps:

dispersion, heating and homogenisation of the ingredients entering into the composition of a frozen confection at a temperature, a pressure and for a period sufficient to hydrate and pasteurize the mixture, cooling of the mixture to a temperature of between 2 and 8° C., optionally aging of the mixture at a temperature of between 2 and 6° C., with or without stirring, during 4 to 24 h, freezing to a temperature of between −4° C. and −10° C., with incorporation of gas providing a degree of overrun of between 30 and 150%, further cooling the partially frozen aerated mixture in a screw extrusion down to temperature below −11° C. At that stage the product can then be filled in a container using the method of the invention before final hardening of the mixture by deep-freezing to a temperature of between −20° C. and −40° C.

Low temperature freezing may be performed by single or twin screw extruders. Using the above container-handling method, containers can be filled with LTF product leading to hitherto unknown complete filling (essentially no voids in the corners of the container) and potential for artistic decoration. LTF products usually have ice crystals of a mean diameter from 10 to 30 microns and fat globules of a mean diameter from 8 to 20 microns and thus can be distinguished from other frozen confectionery.

The invention allows especially filling of high viscous ice cream, such as Low Temperature Freezing frozen confectionery. For example, filling with a filling temperature −10° to −15° C. with an artisan ice cream appeal (visual attractive, parlour style).

The invention allows as well filling combinations of one or more high viscous ice cream flavours, ripple sauces and inclusions.

The invention enables filling of high viscous Ice cream with different filling patterns such as
- weaves
- swirls
- spirals
- layers The invention allows filling of complicated shaped packagings such as acute-angled containers (stars, hearts).

The invention allows filling of other high viscous products like child dairy desserts and purees.

The invention allows the filling with alternating filling optics like different decors and different swirl designs during the production of one product at the same filling line. This gives the opportunity of products with more individual appeal.

The invention claimed is:

1. A method for filling a product in a container, the method comprising the steps of:
    arranging at least one container to be filled on at least one slat of a step-wise driven slat conveyor;
    moving the container on the slat conveyor towards a dispensing nozzle;
    vertically displacing at least one slat supporting the container using a gripper element with protruding portions which laterally engage recessions in the side surfaces of the slat; and
    manipulating the at least one slat supporting the container in a translational degree-of-freedom different from a transport direction of the slat conveyor using the gripper element while dispensing the product from the dispensing nozzle into the container.

2. The method according to claim 1, wherein the vertical displacement is achieved through a lifting movement.

3. The method according to claim 1, wherein the slat is manipulated in a horizontal displacement.

4. The method according to claim 1, wherein the product is a frozen confectionery.

5. The method according to claim 1, wherein the product is a LTF (low temperature freezing) confectionary product.

6. The method according to claim 1, comprising starting movement of the slat supporting the container in a horizontal direction during the vertical displacement.

7. The method according to claim 1, wherein the at least one slat is pre-released off the chains of the slat conveyor before being engaged by the gripper element.

8. The method according to claim 1, wherein the dispensing nozzle is stationary at least during filling.

9. The method according to claim 1, wherein the dispensing nozzle is moved during filling.

10. The method according to claim 1, wherein the slats are separated off the main chains of the slat conveyor during filling.

11. The method according to claim 1, wherein at least one slat supporting the container is additionally moved vertically while filling the product in the container.

12. The method according to claim 1, wherein the product is selected from the group consisting of ice cream, water ice, frozen yoghurt, sherbet, and sorbet.

13. A method for filling a product in a container, the method comprising the steps of:
    arranging at least one container to be filled on at least one slat of a step-wise driven slat conveyor;
    moving the container on the slat conveyor towards a dispensing nozzle;
    separating the at least one slat from the transport chains of the slat conveyor;
    vertically displacing at least one slat supporting the container using a gripper element with protruding portions which laterally engage recessions in the side surfaces of the slat; and
    manipulating the at least one slat supporting the container in a translational degree-of-freedom different from a transport direction of the slat conveyor using the gripper element while dispensing the product from the dispensing nozzle into the container.

* * * * *